United States Patent
Wilshaw et al.

[11] Patent Number: 5,977,003
[45] Date of Patent: Nov. 2, 1999

[54] PARTICULATE MATERIALS

[75] Inventors: Nicholas John Goodwin Wilshaw, Tregony; Jonathan Andrew Hearle, Falmouth; Mathew Thomas Rundle, Newquay, all of United Kingdom

[73] Assignee: ECC International Ltd., United Kingdom

[21] Appl. No.: 08/715,674

[22] Filed: Sep. 18, 1996

[30] Foreign Application Priority Data

Sep. 22, 1995 [GB] United Kingdom .................... 9519419

[51] Int. Cl.$^6$ ............................ C04B 38/00; C04B 33/00
[52] U.S. Cl. .............................. 501/80; 501/84; 501/141; 501/44; 501/128; 501/129; 210/503; 210/510.1
[58] Field of Search ................................ 501/80, 84, 141, 501/144, 127, 128, 129; 210/503, 510.1

[56] References Cited

U.S. PATENT DOCUMENTS

| | | | |
|---|---|---|---|
| 3,608,060 | 9/1971 | Osment et al. ............................. | 501/84 |
| 4,381,998 | 5/1983 | Roberts et al. .......................... | 210/503 |
| 5,015,606 | 5/1991 | Lang et al. ............................... | 501/141 |
| 5,418,195 | 5/1995 | Kostuch et al. .......................... | 501/80 |

FOREIGN PATENT DOCUMENTS

| | | |
|---|---|---|
| 986635 | 3/1965 | United Kingdom . |
| 1010959 | 11/1965 | United Kingdom . |
| 1554943 | 10/1979 | United Kingdom . |
| 2067174 | 7/1981 | United Kingdom . |
| 2271987 | 5/1994 | United Kingdom . |

OTHER PUBLICATIONS

WPI Abstract Accession No. 94–124619/15 & RU 2002714C1 (Talla B.V.) 41.3192, Nov. 1993.
WPI Acc. No. 87–165762/24 & JP 620096537A (Denki) Oct. 24, 1985.

*Primary Examiner*—Karl Group
*Attorney, Agent, or Firm*—Suzanne Kikel

[57] ABSTRACT

A ceramic particulate material which comprises particles having an irregular three dimensional surface profile having jagged projections and a median particle diameter of 200 micrometers or less, the particles being fractals produced by comminution of foamed ceramic material. The material may be such that in a sphere of rotation of the particle, from 30% to 80% of the volume of the sphere is void, the remainder being continuous solid material. The material may be produced by a process which includes providing a suspension of ceramic forming particles e.g., of an aluminosilicate such as clay, in a liquid medium; incorporating a gas in the liquid medium before or after formation of the suspension therein to produce a foamed suspension; extruding the foamed suspension; optionally drying the extrudate formed thereby; calcining the extrudate; and comminuting the calcined material, e.g. by crushing. The material may be used as a substitute for diatomite.

22 Claims, 3 Drawing Sheets

PARTICULATE MATERIALS

BACKGROUND OF THE INVENTION

1. Field of the Invention

The present invention relates to particulate materials. In particular, it relates to ceramic particulate materials.

2. Background Art

Diatomite alternatively known as diatomaceous earth or kieselguhr, is a fine grained material composed chiefly of amorphous silica, which is obtained from naturally occurring sources in sedimentary rock.

Diatomite has several useful properties, including ornate fine particle structure, brightness, low bulk density, high porosity and surface area, insulating ability and relative chemical inertness and, after processing, finds wide commercial use in a range of commercial and industrial applications.

Diatomite does however have disadvantages. It contains substantial amounts of free silica which, when the material is calcined, is believed by some to present a potential health hazard. As a result, care has to be exercised in the storage, handling and disposal of processed diatomite. For example, disposal of spent processed diatomite which has been employed in filtration processes is usually carried out by burial in landfill sites.

SUMMARY OF THE INVENTION

Also, because of its natural origins, diatomite obtained from different sources has variable composition and properties.

The purpose of the present invention is to provide a particulate material which can amongst other things be used in the same applications as processed diatomite but does not show the disadvantages of that material.

According to the present invention there is provided a ceramic particulate material which comprises particles having an irregular three dimensional surface profile having jagged projections and having a median particle diameter, as defined hereinafter, of 200 micrometers (microns) or less, the particles being fractals produced by comminution of foamed ceramic material.

It is to be understood that "median particle diameter" as used herein is as measured relative to measurements obtained by on-line particle size analysis in a suspension in water by low angle laser light scattering (LALLS) using a Malvern Mastersizer M95/6 instrument supplied by Malvern Instruments Ltd of Malvern, Worcester, UK.

The material according to the present invention has particles which are manufactured into shape (as distinct from diatomite where the shape is naturally occurring) and which are formed as fractals by comminution of foamed ceramic material. The foamed ceramic material may be material which has been extruded, optionally dried and calcined. The foamed ceramic material may have cells or bubbles having mainly sizes in the range 5 $\mu$m to 100 $\mu$m, especially 10 $\mu$m to 60 $\mu$m.

The particles of the material according to the present invention are fractal shaped particles or shards. Such particles may comprise complex shapes having a stem and jagged projections as illustrated hereinafter. The projections and/or the stem themselves may comprise curved platelets, i.e. platelets which are convex on one face and concave on the other, or concave on both faces. The curvature may result from the platelets having been broken from the walls of cells or bubbles of foamed ceramic material. The particles may, for example, be multi-cuspate in form. The particles may comprise a plurality of adjoining projections broken from the cell walls of adjacent cells of the foamed ceramic material.

The particles of the material according to the present invention are poorly packing. A collection of the particles pressed together will form a porous body extending uniformly in three dimensions in contrast to particles which are platey and will pack together closely in essentially a two dimensional plate formation. The particles of the material according to the present invention may be such that in a volume occupied by a sphere of rotation of the particle from 30 per cent to 80 per cent, e.g. from 40 per cent to 70 per cent, of the volume is void, i.e. not occupied by the ceramic material comprising the particle. However, the ceramic material which comprises the body of each particle is preferably itself substantially non-porous on a micron size scale. The material may have some pores on a sub-micron scale, eg. pores less than 0.1 $\mu$m in size. Thus, the ceramic material comprising the body of each particle may comprise continuous solid material.

Various methods are known in the prior art for the production of foamed ceramic material and the foamed ceramic material which may be employed to form by comminution the material according to the present invention may be prepared by one of these various methods. Thus, the foamed ceramic material may be produced by one of the methods described in prior patent specifications GB986,635; and GB2,067,174B.

The foamed ceramic material may advantageously be prepared by the method disclosed in Patent Specification GB.2,271,987 in which a ceramic granular foam material is prepared by:

(a) preparing a foam from a slurry of a particulate material, eg. a clay (b) dividing the foam into discrete pellets or prills preferably by extrusion; and (c) calcining the granules at an elevated temperature.

The foamed ceramic material employed to form the particulate material according to the present invention itself desirably comprises granules having a diameter less than 200 $\mu$m which comprises bubbles or cells desirably 100 $\mu$m or less in size, especially 10 $\mu$m to 60 $\mu$m in size. Such granules are described for example by the method described in Applicants' GB2,0,271,987B. The bubbles produced by the method described therein are polyhedral bubbles of varying sizes bounded by thin walls, the walls and junctions between walls generally bounding two or more bubbles. A particle according to the present invention formed from the junction between eight adjacent bubbles could, in one of many possible forms, have six pointed or jagged projections which are disposed substantially orthogonally as illustrated hereinafter.

The material which is employed to form the foamed ceramic material (from which the particulate material according to the present invention is obtained) may comprise any one or more of the known minerals and/or synthetic materials from which ceramics may be formed.

The foamed ceramic material which is comminuted may comprise pellets or prills, eg. having a length of from 0.5 mm to 20 mm, especially 1 mm to 5 mm, and may have a bulk density in the range 0.12 g.cm$^{-3}$ to 0.7 g.cm$^{-3}$. The solid material of that material will, following calcination, comprise inorganic particles, eg. of aluminosilicate, which have been fused together.

Ceramics comprises a broad class of non-metallic, inorganic materials from which solid articles may be made. Such materials have a high melting or sublimation point.

For example, known ceramics include traditional ceramics e.g. clay products, cements, and the like which have been known and used for many centuries and also ceramics which have found uses in less traditional applications, which are known as "new ceramics" e.g. various pure or mixed oxides, carbides and nitrides, e.g. as used in nuclear fuels, magnetic materials, dielectric materials, non-silicate glasses, molecular sieves, catalysts, metal-ceramic composites, enamels, refractories, talcs, abrasives and hard cutting materials. In general, ceramics are formed from particulate materials which are either obtained as minerals or are manufactured synthetically or a mixture of both.

Where the inorganic particulate material employed to produce foamed ceramic material for production of the fractal particles according to the present invention the material may comprise one or more naturally occurring silicon-containing compounds which do not contain substantial quantities of free silica, especially one or more silicates or aluminates. Such compounds may comprise or one or more silicates of, for example, calcium, magnesium or aluminium. The compound may be a naturally-occurring mineral, such as talc, a clay mineral, mica or wollastonite. Preferably the compound is an aluminosilicate, for example a clay mineral of the kandite and/or smectite type. Clay minerals of kandite group, for example kaolinite, dickite, nacrite and halloysite, have been found to be particularly advantageous. "Kaolinite" includes kaolin type clays, ball clays, fire clays and China clays. Such clays occur in nature (and may be used) in the form of kaolinite plus other minerals, eg. one or more of illite, mica, quartz and feldspar. The kandite clay mineral may be used in its natural, hydroxylated or hydrous state. Where the aluminosilicate comprises a smectite clay it may comprise for example one or more of bentonite, hectorite and saponite.

Where the foamed ceramic material is formed from one or more synthetic ceramic forming materials (optionally together with mineral material), the material(s) may in general be selected from the wide range of synthetic materials known to form ceramics. Thus, the material(s) may, for example, be selected from silicon carbide, silicon nitride, aluminimum nitride, boron nitride, boron carbide, alumina, aluminophosphates, magnesium silicate and various oxide materials, including zirconia, urania and thoria.

The mineral and/or synthetic material employed to produce foamed ceramic material will generally be employed as particulate material incorporated in a suitable liquid medium in which a suitable suspension or dispersion can be formed. Suitable liquid media are known in relation to the formation of ceramic materials from the various classes of known material. In many cases, especially where the particulate material comprises a mineral, a suitable liquid medium comprises water or an aqueous solution. Foam may be made from the liquid medium by a process involving incorporating a gas in the liquid. The liquid may contain a surface active agent or surfactant to form a stable froth.

Examples of suitable surface active agents include known cationic, anionic, non-ionic and amphoteric surface active agents.

The gas may for example be air incorporated by agitating the liquid medium to form a froth. The gas may be added to the liquid medium before or after the particulate material (and other optional additives) is added thereto.

Conveniently, as described in GB2,067,174B, an aqueous foam containing a surface active agent may be formed prior to addition to the ceramic forming particulate material. The aqueous foam may be added to a paste or slurry containing the particulate material. The addition may conveniently be carried out in an extrusion machine from which foamed ceramic material is to be extruded. The machine may be a screw extruder, eg. a co-rotating twin screw extruder. The machine may extrude foamed ceramic material into a plurality of individual elongate portions. The portions may be divided by allowing extrudate to fall onto a moving belt which by the action of carrying away the portions causes lengths or portions to break from the extruding material. In any event, the portions, pellets or prills so formed may be collected and sized by one or more screen meshes, e.g. so that only lengths greater than a chosen minimum length, eg. a minimum in the range 1 mm to 5 mm, are selected. The selected portions may be further treated by drying in an heated atmosphere, eg. 100° C. to 200° C. and thereafter by calcining as described hereinafter.

The foamed ceramic material produced in the manner described may incorporate one or more additive materials added at one or more of the stages of producing such material or after its production. The foamed ceramic material may, for example, incorporate one or more of a fluxing material, for example forming from 5 per cent to 50 per cent by weight of the mixture with the particulate material (mineral and/or synthetic material), the fluxing agent comprising for example mica or feldspar, which subsequently reduces the temperature at which the material may be calcined, a biocide, eg. forming up to 1 per cent by weight of the solids portion of the foamed ceramic material, or an organic or inorganic binder or filler or a combustible material, e.g. forming up to 30 per cent by weight of the solids portion of the foamed ceramic material.

A preferred method of forming the ceramic particulate material according to the present invention comprises the following steps:

(a) preparing a foam from an aqueous mixture of a particulate ceramic forming material and a fluxing agent;

(b) drying the foam;

(c) calcining the foam at an elevated temperature to form a calcined foamed ceramic material; and (d) comminuting the calcined foamed ceramic material.

Calcining may be carried out in a known manner. The temperature and time of the calcining will depend on the material being calcined and the amount of fluxing agent present but, for example, material comprising clay may be calcined at a temperature typically in the range 800C to 1600C for a period of 5 minutes to 24 hours.

The comminution employed to form the particles of the material according to the present invention may be performed by a device which exerts a gradual pressure or controlled squeezing action on the foamed ceramic. This action cause the foamed ceramic to fracture at its weakest points, which are generally the thin cell walls. The device requires an adjustable discharge gap by which the crushing surfaces are spaced apart during the comminution. Suitable comminuting devices which have such an adjustable discharge gap include smooth roll crushers, cone crushers and gyratory crushers. The comminution may alternatively be carried out in other known ways, e.g. by milling.

Following comminution, the particles of the material according to the present invention may be separated into size ranges according to the applications for which such particles may be used. For example, for some filtration applications, particles having diameters in the range 10 $\mu$m to 2 $\mu$m may be selected. Particles smaller than 2 $\mu$m are unsuitable for filtration as they are generally too fine to provide a suitably porous filtration medium. For other filtration applications, a size distribution in the range 10 µm to 5 µm might for example be more appropriate.

Preferably, for filtration in brewing the particles embodying the invention have a peak in the particle size distribution of from 10 µm to 20 µm and an effective bed voidage, the volume available to contain separated material in a filter bed, of greater than 10% of the bed volume, eg. from 10% to 40% of the (smallest available) bed volume. However, materials which have finer or coarser particles than those stated may also be used in this application.

The material according to the present invention is potentially useful in all of the applications in which processed diatomite is used. Surprisingly and beneficially the material according to the present invention provides a substitute for diatomite wherein the aforementioned disadvantages, i.e. variability of composition and properties and concern about being a potential health hazard, can be reduced or substantially eliminated. The need for careful and expensive handling and disposal, e.g. by burial in landfill sites, can thereby be eliminated. The material according to the present invention retains the useful properties of processed diatomite. Thus, the particles of the material according to the invention show a rough surface, poor packing, thermal stability, insulation, chemical inertness, and brightness which are desirable properties in the various uses of diatomite. The loose packing ability resembles that of processed diatomite and for example provides filtration of particles in liquids with filtration properties similar to those of diatomite.

The material according to the present invention may therefore be used in the following applications:

(a) as a filter medium for the filtration of particles from a liquid or gas;

(b) as an inorganic filler or extender material;

(c) as an absorbent;

(d) as a component of insulating brick.

In some of these applications the material according to the present invention may be further processed to the form suitable for the application. For example, porous ceramic blocks of the material may be made by sintering a pressed body of the particles. Such blocks may be used as solid filter media, e.g. for filtration of gases.

The filtration applications in which the material according to the present invention may be used include clarification of various liquids, e.g. in the brewing industry, e.g. beer and wine, vegetable oils, syrups, sugars, pharmaceutical products and swimming pool water.

As noted above, particles of the material according to the present invention have poor packing characteristics and if a bed is formed of such particles the bed has a high degree of voidage and the voids can be in a narrow size distribution, e.g. in the range 0.1 µm to 10 µm. A loose bed of the particles is therefore suitable as a filter medium for the above liquid filtration applications, e.g. in the brewing industry.

The filler and extender applications in which the material according to the present invention may be used include use in paints, rubbers and plastics and other polymeric materials. The material is, for example, useful to substitute diatomite as a matting agent in paints.

Other filler applications in which the material according to the present invention may be used include use as a blocking agent in plastics films; as an anti-caking agent for fertilisers, thermal insulating material, catalyst carrier, polish, abrasive, pesticide and fertiliser carrier; and as a chromatographic support.

Ceramic particulate materials according to the present invention may be formed into ceramic bodies which may be used in known ceramic applications. Such formulation may involve sintering a collection of the particles optionally with the application of pressure. Such bodies may be shaped by use of a suitably, shaped cast or mould. Alternatively, such bodies may be shaped by machining after formation.

Various irregular inorganic particles are known in the prior art but none compromise fractals formed in the manner described herein.

Embodiments of the present invention will now be described by way of example with reference to the accompanying drawings, in which:

DESCRIPTION OF THE PREFERRED EMBODIMENTS

Figure 1:
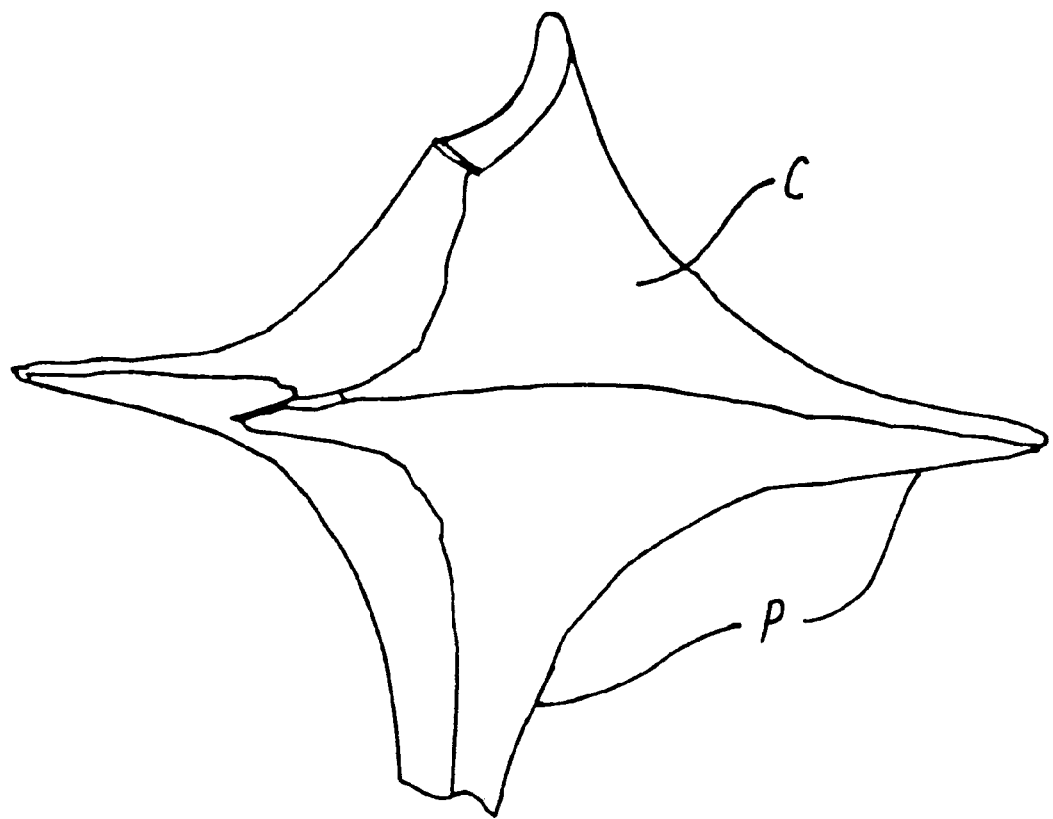
FIG. 1 is a perspective view of a particle of material embodying the invention.

The following method, Method A, is an example of a method which was employed to produce samples of particulate ceramic material embodying the present invention.

Method A

An English ball clay was fed as a substantially dry powder at a rate of 15 kg.hr$^{-1}$ into the feed inlet of a twin screw, co-rotating extruder. At the same time, sufficient water to form a suspension containing 50% by weight of dry ball clay was injected through inlets provided in the casing of the extruder. The ball clay had a particle size distribution such that 85% by weight consisted of particles having an equivalent spherical diameter smaller than 2 µm and had the following mineralogical composition:

| | |
|---|---|
| kaolinite | 56% by weight |
| mica | 34% by weight |
| quartz | 10% by weight |

There was also introduced, through an inlet situated approximately midway between the feed inlet and the extruder plate, foam, which had been separately generated by passing under pressure through a fine mesh a mixture of air, water and a cationic surfactant, which was a higher alkyl trimethyl quaternary ammonium chloride, the higher alkyl component being a mixture of alkyl groups having from 13 to 15 carbon atoms. The amount of foam added was such that there were present 5 liters of foam per kilogram of ball clay suspension. The foamed clay mixture was extruded through a plurality of apertures of diameter 3 mm and the extruded foamed clay was found to have a density of 550 kg.m$^{-3}$. The noodles produced by extrusion were collected on a moving belt, portions breaking into pellets or prills by the action of the belt moving away from the extrusion nozzles. The portions on the belt were dried by hot air for a period of 5 to 10 minutes after which they were sized by a screen into portions greater than 3 to 4 mm.

The selected portions were loaded into refractory saggars and were passed through a calcining tunnel kiln. The residence time in the tunnel kiln was 0.5 hour and the maximum temperature to which the noodles were exposed was 1050C.

The calcined noodles were crushed in a jaw crusher and the crushed material was screened on a sieve having an aperture size of 2 mm. Samples of products were prepared as in the following examples.

PRODUCT EXAMPLE 1

Approximately 100 kg of the fraction of the crushed material which passed through the 2 mm sieve was lightly comminuted in a cone crusher with an average discharge gap set to 1 mm. The comminuted material was screened in the dry state on a sieve of aperture size 75 $\mu$m, and the material passing through the sieve was retained as the "Pass 1 product" and was found to have a bulk density of 0.504 g.cm$^{-3}$. The material retained on the sieve was passed through the cone crusher a second time with the average discharge gap set to 0.4 mm. Again the comminuted material was screened in the dry state on a sieve of aperture size 75 $\mu$m. The material passing through the sieve was retained as the "Pass 2 product", and was found to have a bulk density of 0.570 g.cm$^{-3}$.

Samples of each product were suspended in water containing a dispersing agent and a particle size distribution curve was obtained for each product by means of a "SEDIGRAPH 5100" particle size analyser, manufactured by Micromeritics Corporation. The percentages by weight of particles in each product having equivalent spherical diameters larger than 10 $\mu$m, larger than 5 $\mu$m and smaller than 2 $\mu$m, respectively, are set forth in Table 1 below. As a comparison, the same particle size parameters are given for a sample of a processed diatomite material such as is conventionally used as a filter medium in water filtration candles.

TABLE 1

| | Percentage by weight | | |
|---|---|---|---|
| Material | Larger than 10 $\mu$m | Larger than 5 $\mu$m | Smaller than 2 $\mu$m |
| Pass 1 Product | 45.7 | 64.1 | 19.6 |
| Pass 2 Product | 29.7 | 49.9 | 25.4 |
| Diatomite | 14.3 | 38.3 | 32.5 |

The particles obtained in the Pass 1 and Pass 2 products generally comprised fractals having curved jagged platelets extending as projections in three dimensions. FIG. 1 illustrates an example of one of the many possible forms of such fractal wherein six projections P are formed radiating from a central portion C. Such a fractal is derived from eight adjacent cells the projections P being formed from the cell walls between adjacent cells and the central portion C being formed from a junction between cell walls. In general, the projections P have different sizes since the cells have different sizes.

The particle illustrated in FIG. 1 represents an idealised form of fractal. An actual particle of material embodying the invention comprises enclosed regions in the interior of the particle which are curved platelet regions formed from cell walls.

Both the Pass 1 and Pass 2 products were found to perform well as filter media in water filtration candles.

Figure 2:
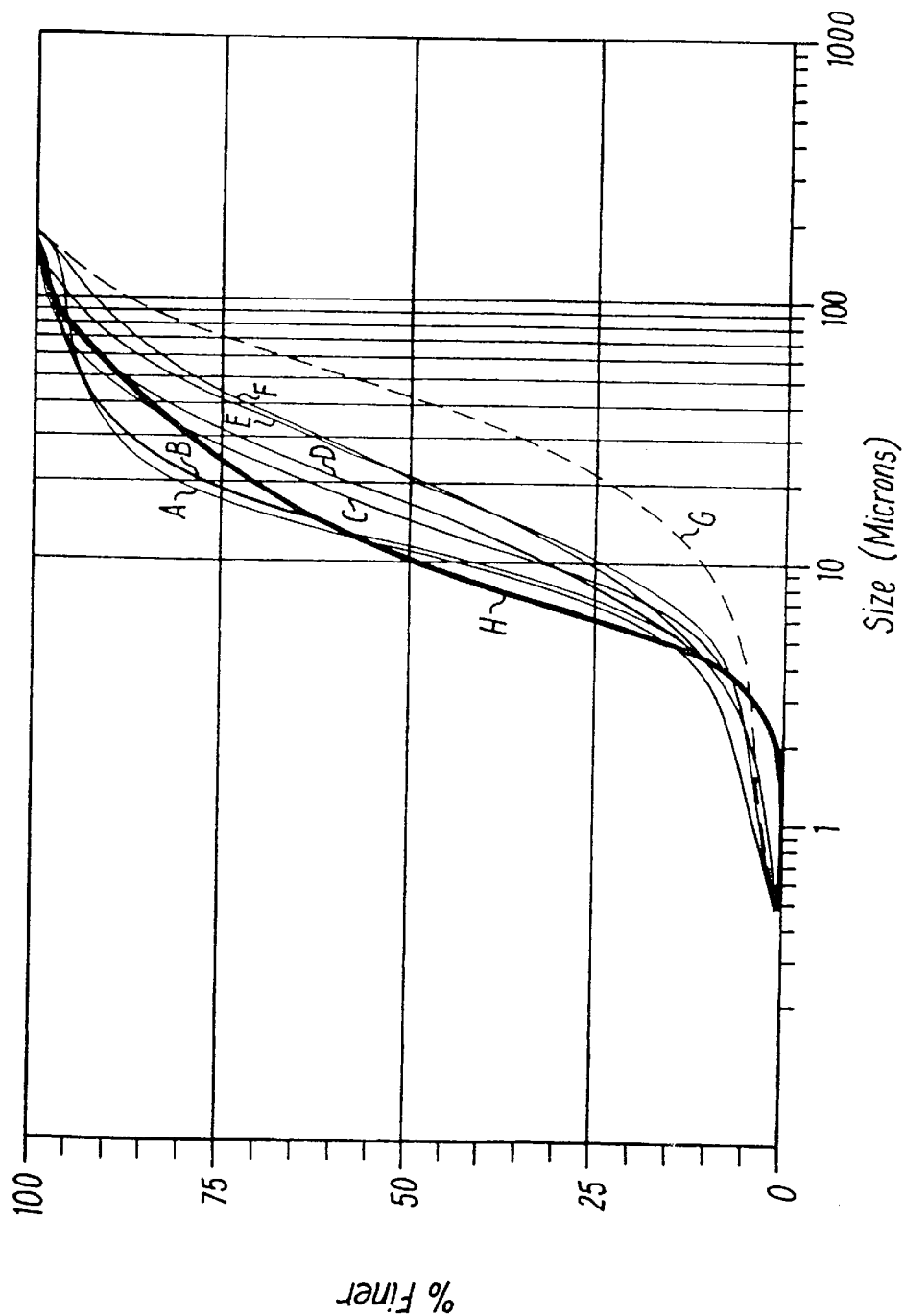
FIGS. 2 and 3 are size distribution graphs for comparing particle size distributions of material embodying the present invention with prior art processed diatomite.

FIG. 2 illustrates how the particle size distribution of material embodying the present invention may be matched to that of diatomite. Curves A to G in FIG. 2 represent the particle size distributions of seven commercially available processed diatomite products (having the respective trade names FPI-W, FP4, Celite 545, Celite 512, Celite 575, Standard Superol and Celite 578). Curve H represents the particle size distribution of a material embodying the present invention and prepared by Method A above and classified using an Alpine Zig Zag A 100 MZR classifier.

Figure 3:
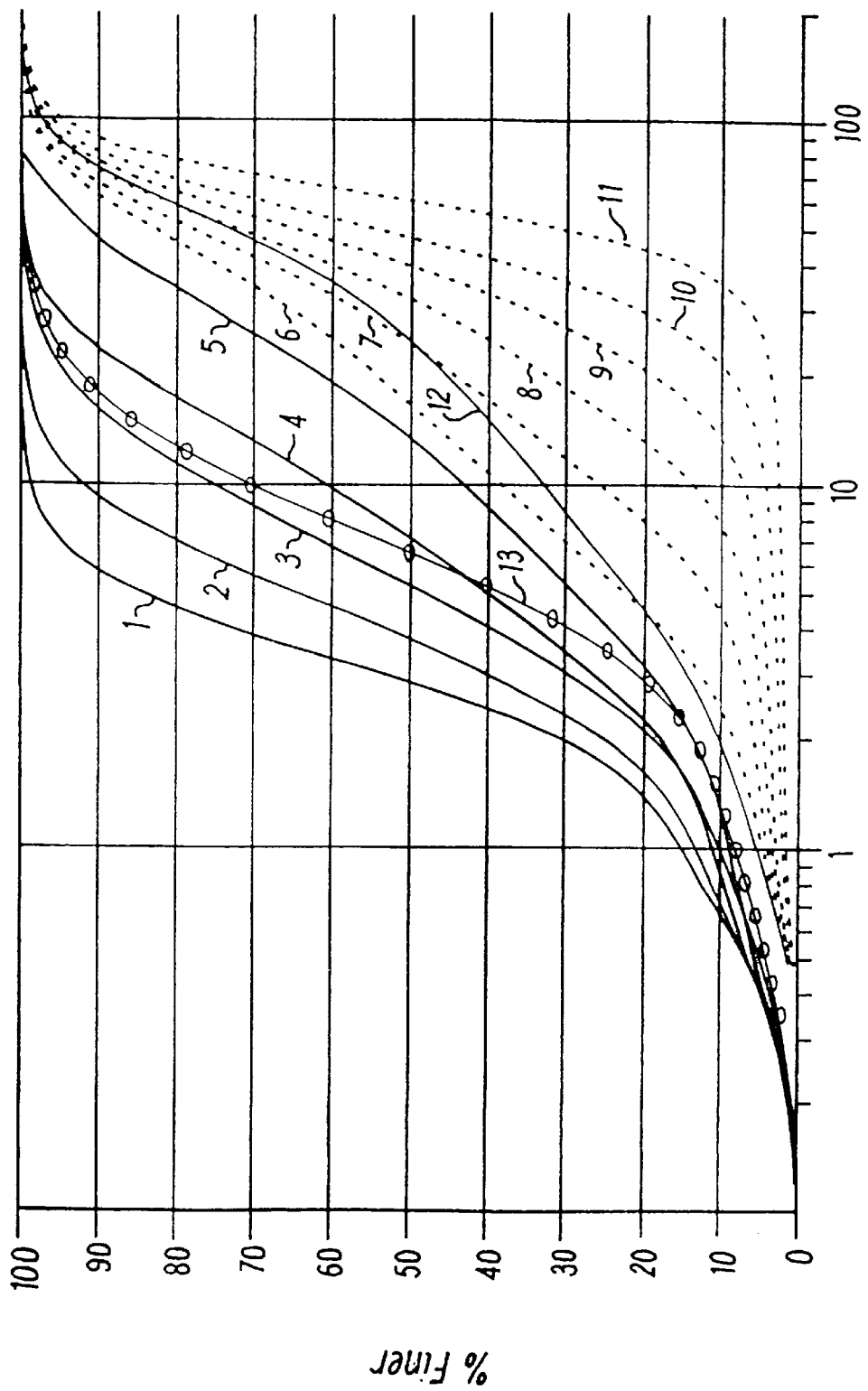

FIG. 3 illustrates how the particle size distribution of material embodying the invention made by Method A may be varied and selected according to the requirements of the application in which the material is to be used. The material produced as in Method A was classified using an Alpine Zig Zag A100MZR classifier having an adjustable speed setting which varies the nominal size at which the material is separated into coarse and fine material. Curves 1 to 5 in FIG. 3 represent the fine material, after separation, with the classifier running at speeds of 15000, 11000, 8000, 6000 and 4000 units respectively. Curves 6 to 11 represent the coarse material, after separation, with the classifier running at speeds of 20000, 15000, 11000, 8000, 6000 and 4000 units respectively, Curve 12 represents the nominal coarse fraction (screen product with no fines taken out) For comparison, curve 13 represents the particle size distribution of a commercially available diatomite product having the trade name Celite 263.

PRODUCT EXAMPLE 2

Material embodying the present invention produced as in Method A was screened to separate a fraction having particles smaller than 53 $\mu$m. This material and Celite 281 a commercial diatomite paint were separately added to a known matt emulsion paint composition to investigate the utility of these materials as paint matting agents. The compositions formed contained by weight 43.7% water, 20% TiO$_2$, 15% vinyl binder, 12% fine kaolin, 3% of the investigated matting agent and 6% other minor additives (in total).

The two matting agent-containing compositions were each formed into a wet film 150 $\mu$m thick and the gloss of the films, ie. percentage reflectance to light at an angle of reflectance equal to a given angle of incidence, was measured at 60° and 85°. The gloss values obtained for material embodying the present invention, viz 4.4% at 850 and 13% at 60°, compared favourably with the corresponding values for Celite 281, viz 4.6% at 85° and 11.3% at 60°. Also, the material embodying the invention showed little deleterious effect on other desirable properties in the paint composition, eg. scratch resistance, transparency, smoothness, mechanical properties and weathering.

PRODUCT EXAMPLE 3

Materials embodying the invention and having particle size distributions as described by curves 3, 4 and 5 in FIG. 3 were separately used in beer brewing processes to remove yeast and other solids from the liquor containing them in a known way. The liquor to be filtered together with an excess of the particulate material was in each case passed through a vessel to a filter press comprising a coarse cloth pre-coated with filtered collected in the particulate material at the filter press.

What is claimed is:

1. A ceramic particulate material which comprises particles having an irregular three dimensional surface profile having jagged projections and a median particle diameter of 200 micrometers or less, said particles being fractals produced by comminution of foamed ceramic material, each of said particles comprising a solid stem and said projections extending from said stem and being comprised of broken platelets having curved surfaces.

2. A ceramic particulate material as in claim 1 and wherein the material comprises essentially particles having a median particle diameter in the range 2 micrometers to 100 micrometers.

3. A ceramic particulate material as in claim 1 and wherein the particles of the material are such that in a sphere of rotation of the particle from 30 per cent to 80 per cent of the volume of the sphere is void, the remainder being continuous solid material.

4. A ceramic particulate material as in claim 1 and wherein the particles have a shape in which a plurality of projections extend radially in different directions from a stem portion.

5. The ceramic particulate material of claim 1 wherein said foamed ceramic material comprises cells or bubbles having an average cell diameter of 100 micrometer or less.

6. The ceramic particulate material of claim 1 wherein said comminution comprises crushing or milling.

7. The ceramic particulate material of claim 6 wherein said particles are produced by said crushing with a device having surfaces which serve as crushing surfaces with an adjustable discharge gap between said surfaces.

8. A ceramic particulate material of claim 1 wherein said foamed ceramic material is produced by a process which includes providing a suspension of ceramic forming particles in a liquid medium, and incorporating a gas in the liquid medium before or after formation of the suspension therein.

9. A ceramic particulate material of claim 8 wherein the said process also includes extruding the foamed suspension, optionally drying the extrudate formed thereby, and calcining the extrudate.

10. A ceramic particulate material of claim 8 wherein the ceramic forming particles comprise naturally occurring mineral particles.

11. A ceramic particulate material of claim 8 wherein the ceramic forming particles are synthetic particles.

12. A ceramic particulate material of claim 10 wherein the mineral particles comprise an aluminosiliceous material which is present optionally together with one or more other materials.

13. A ceramic particulate material of claim 12 wherein the mineral particles comprise a clay mineral and the liquid medium comprises an aqueous medium.

14. A ceramic particulate material of claim 12 wherein the mineral particles are mixed with a fluxing agent forming from about 5 percent, by weight, to about 50 percent, by weight, of the mixture with the mineral particles.

15. A ceramic particulate material of claim 8 wherein the liquid medium also includes a surface active agent when the gas is incorporated therein.

16. A ceramic particulate material of claim 8 wherein the gas is air which is added by frothing the liquid medium.

17. A ceramic particulate material of claim 8 wherein the liquid medium is foamed before addition of the mineral and the foamed liquid medium is added to and mixed with the mineral material in an extruding machine and the foamed ceramic material produced by the mixture is extruded by the extruding machine.

18. A ceramic particulate material of claim 17 wherein the foamed ceramic material is extruded by the extruding machine into a plurality of elongate portions.

19. A ceramic particulate material of claim 18 wherein the extruding machine comprises a co-rotating twin screw extruder.

20. A ceramic particulate material of claim 8 wherein the foamed ceramic material is calcined at an elevated temperature in the range 800° C. to 1600° C. prior to the comminution.

21. A ceramic particulate material of claim 1 wherein, following comminution, particles of different size classes are separated so that particles having a selected particle size class or range may be selected to form a product.

22. The ceramic particulate material as claimed in claim 1 being comprised of a loosely packed bed of said fractal particles.

* * * * *